UNITED STATES PATENT OFFICE.

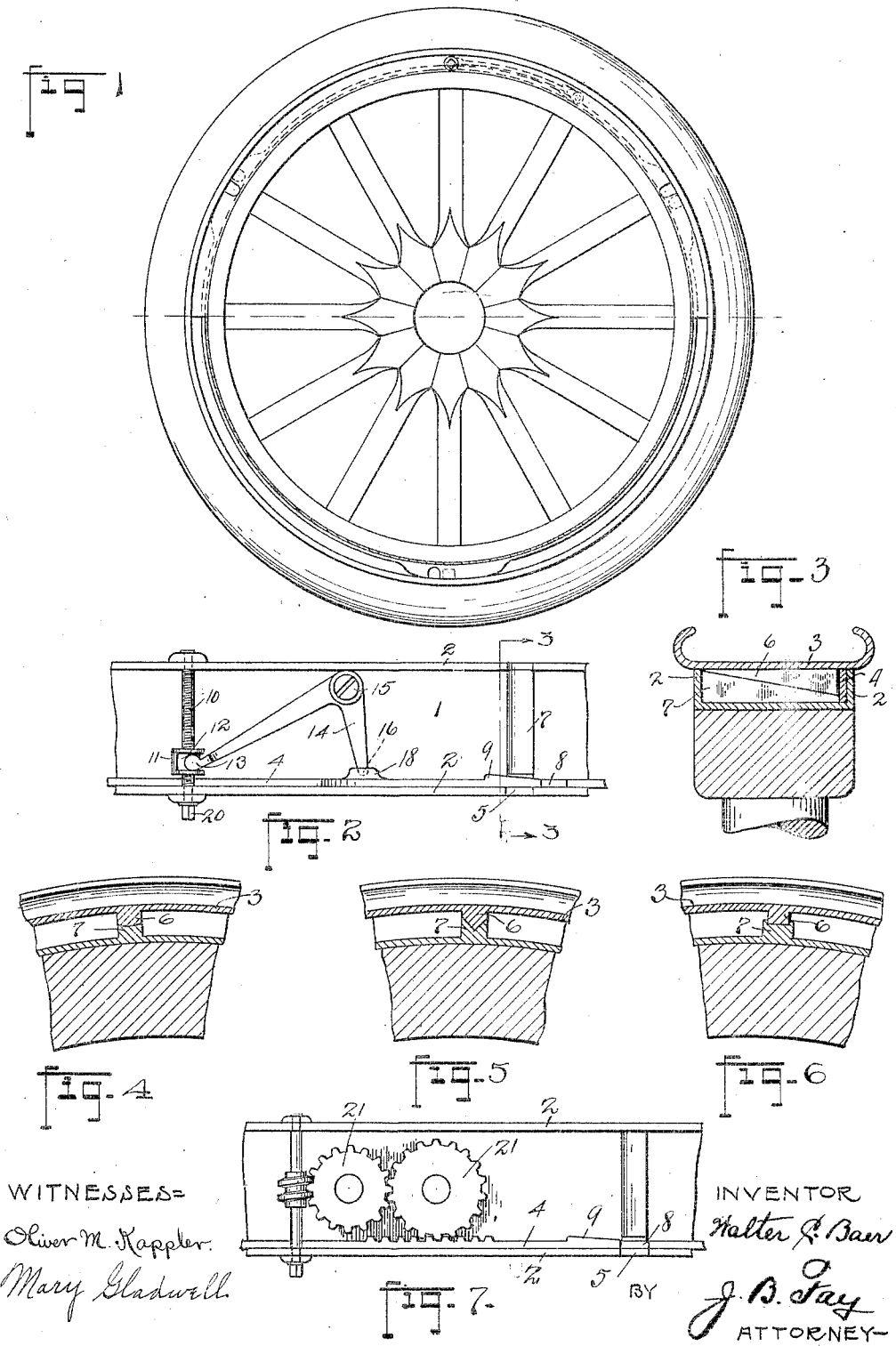

WALTER CHARLES BAER, OF TOLEDO, OHIO.

DEMOUNTABLE RIM.

1,068,204.   Specification of Letters Patent.   Patented July 22, 1913.

Application filed January 11, 1912. Serial No. 670,537.

*To all whom it may concern:*

Be it known that I, WALTER C. BAER, a citizen of the United States, and a resident of Toledo, county of Lucas, and State of Ohio, have invented a new and useful Improvement in Demountable Rims, of which the following is a specification, the principle of the invention being herein explained and the best mode in which I have contemplated applying that principle, so as to distinguish it from other inventions.

My invention relates to a demountable rim to be used on wheels, and is particularly adapted to automobile work by reason of its quick and convenient adjustment. Various rims of this type have, of course, been in general use for some time, but all of them present several disadvantages. Many of these rims are extremely heavy in construction, while those which are light are not sufficiently strong and positive in engagement to stand up under the extremely rough usage to which they are subjected. The present rim entirely overcomes these objections, and may, of course, be used with any type of so-called "quick-detachable" rim desired.

To the accomplishment of these and related ends, said invention, then, consists of the means hereinafter fully described and particularly pointed out in the claims.

The annexed drawing and the following description set forth in detail certain mechanism embodying the invention, such disclosed means constituting, however, but one of the various mechanical forms in which the principle of the invention may be used.

In said annexed drawing: Figure 1 is a side elevation of my demountable rim in place on a vehicle wheel; Fig. 2 is a plan view showing the operating mechanism; Fig. 3 is a sectional view on the line 3—3 in Fig. 2; Figs. 4, 5 and 6 are sectional views showing various forms which the engaging lugs may take; Fig. 7 is a plan view similar to that in Fig. 2, illustrating a modification of my operating mechanism.

In Fig. 1, I show a rim 1 which will preferably be formed with up-turned flanges 2 and may be fixedly attached to a wheel. Upon this fixed rim there may be engaged a second rim 3 which is securely held thereon by means of a circumferentially movable member 4 mounted upon the fixed rim. At several points in the outer flange of the fixed rim are openings 5 which will be engaged by lugs 6 mounted on the under side of the second rim. As the second rim is forced into place, these lugs 6 will engage complementary lugs 7 mounted upon the fixed rim. The lugs may be grooved, as shown in Fig. 1, or they may take several forms, as shown in Figs. 5 and 6. In either case the lugs upon the fixed rim slope outwardly and downwardly. The lug on the removable rim will slope in corresponding direction in order to securely engage the fixed lug, as the removable rim is forced into place. This engagement must be extremely secure, as the driving of the removable rim by means of the fixed rim will, of course, be made largely through this engagement. Also, lugs 6 may be made to engage the flange 2 on the inner side of the fixed rim and thus provide the necessary driving connection.

The circumferentially movable member is in the form of a circular ring which is freely movable around the surface of the fixed rim adjacent to the outer flange. It has apertures 8 which correspond to the apertures in the flange of the fixed rim, and upon a slight circumferential movement these apertures are adapted to coincide, thus permitting the insertion of the lugs upon the removable rim. Adjacent to these apertures on the member are mounted inclined surfaces or lugs 9 which are adapted to contact and force into secure engagement the lugs upon the removable rim, as will be readily understood. Various means may be provided for the moving of this member circumferentially around the rim, but an extremely simple and positive means consists of the members shown in Fig. 1, viz., a screw 10 mounted transversely of the fixed rim in the flanges thereof and engaging a member 11, having grooves 12 which are engaged by the end 13 of a bell-crank member 14 pivotally mounted on the pin 15. The other end 16 of this bell-crank engages the movable member by means of a loose socket joint 18, and as the screw is rotated by any suitable means which may be adapted to engage the bolt-head 20 on the end of the screw, the bell-crank is rotated and thus forces the movable member circumferentially around the fixed rim. When so moved, this member will entirely close the apertures in the outer flange, thus securely and positively locking the removable rim in place, and at the same time preventing the entrance of dirt and water into the space between the removable and the fixed rims.

In the modified form shown in Fig. 7, I provide gears 21, which are adapted to move the member circumferentially around the rim, as will be readily understood. These and various other constructions may be used for the purpose of moving the circumferential member, but it is thought that the simplest and best means of accomplishing this purpose are the means shown in Fig. 1, and described above.

No claim is made to any type of tire retaining means which may be fitted upon the removable rim, and it will be clear that any suitable form may be used for this purpose.

My demountable rim possesses several advantages. It is positive in engagement and disengagement. It is extremely simple to operate, there being only one bolt or screw, and by reason of the closing of the apertures in the outer flange of the fixed rim, no dirt or water can gain entrance to the inner space, thus preventing wear and rust and retaining the mechanism in good condition, rendering the operation easy and convenient.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a device of the class described, the combination of a fixed rim having lugs on its outer surface and upturned flanges on its inner and outer edges, such outer flange having openings therein; a second rim having lugs adapted to enter such openings in such outer flange and engage with such lugs on said fixed rim; a circumferentially movable member mounted on said fixed rim adjacent to such outer flange, said movable member having inclined lugs adapted when said member is rotated, to contact such lugs, thereby wedging said second rim in such engagement; and suitable means inclosed in said fixed rim for actuating said movable member.

2. In a device of the class described, the combination of a fixed rim having grooved lugs on its outer surface and upturned flanges on its inner and outer edges, such outer flange having openings; a second rim having lugs with raised portions adapted to fit in the grooves of such grooved lugs, such lugs adapted to enter such openings in such outer flange and engage with such grooved lugs; a circumferentially movable member mounted on said fixed rim adjacent to said outer flange, said movable member having inclined lugs adapted, when said member is rotated, to contact such aforementioned lugs, thereby wedging the same in such engagement; and suitable means inclosed in said rim for rotating said movable member.

3. In a device of the class described, the combination of a fixed rim having grooved lugs on its outer surface and upturned flanges at its inner and outer edges, such outer flange having openings therein; a second rim having lugs adapted to enter such openings in such outer flange, and engage with such lugs on said fixed rim; a circumferentially movable member mounted on said fixed rim adjacent to said flange, said movable member having inclined lugs and adapted when said member is rotated to contact such lugs and wedge said second rim in such engagement, said movable member being adapted when in locking position to cover such openings in said flanges; and suitable means inclosed in said fixed rim for actuating said movable member.

4. In a device of the character described, the combination of a fixed rim having grooved lugs on its outer surface, and upturned flanges at its inner and outer edges, such outer flange having openings therein; a second rim having lugs with raised portions on its inner surface, such lugs with raised portions adapted to enter such openings and engage with such grooved lugs; a circumferentially movable locking member mounted on said fixed rim adjacent to such outer flange, said member having inclined lugs adapted, when said member is rotated, to wedge such lugs in such engagement, said member also adapted to close such openings when in locking position; and suitable means inclosed in said fixed rim for rotating said movable member.

5. In a device of the class described, the combination of a fixed rim having upturned flanges, a second rim adapted to removably engage said fixed rim, a member mounted on said fixed rim and movable circumferentially thereon, and means including a threaded bolt, and a bell crank lever pivotally mounted on said fixed rim and adapted to be actuated by said bolt, said lever being connected to said member and actuating the same, whereby said member, when so actuated locks said removable rim securely on said fixed rim.

Signed by me this 8th day of January 1912.

WALTER CHARLES BAER.

Attested by—
 ANNA L. GILL,
 JNO. F. OBERLIN.